N. W. SPEERS.
COTTON PRESS.

No. 110,304. Patented Dec. 20, 1870.

Witnesses: Inventor.

United States Patent Office.

NOAH W. SPEERS, OF MEMPHIS, TENNESSEE.

Letters Patent No. 110,304, dated December 20, 1870; antedated December 8, 1870.

IMPROVEMENT IN COTTON-PRESSES.

The Schedule referred to in these Letters Patent and making part of the same.

I, NOAH W. SPEERS, of the city of Memphis, in the county of Shelby and State of Tennessee, have invented certain Improvements in Cotton-Press, of which the following is a specification The first part of my invention relates to the framework, that answers as a support or bearing for the worm-screw, and the bevel-wheels, that are attached to the upper part of the worm-screws, the bearings above and below also form a bearing for the screw or rack, obviating the springing of the rack or screw, as would be the case if not thus supported while pressing a heavy bale.

The second part of my invention relates to the application of the worm-screw and the two bevel-wheels with the pulley-wheel, which can be made any size to get any amount of power desired. The rack thus applied to a cotton or hay-press can be applied singly or double, but the bearings are more equal with two than one, yet one would answer by adding friction-rollers.

The third part of my invention relates to the peculiar shape and construction of the follow-block, which is attached to the rack timbers; the projections on the four corners answer two purposes: one as a guide; the other as a stay-brace, when the block is down, to prevent the bale from jumping out when the doors are raised to put on the ropes or ties. The third advantage is, when the box is filled with cotton to be pressed, turn the ends of the bagging, which is laid under the follow-block, over the tie-straps and under the guides, and over the slot cut out of the guide, so when the bale is pressed the bagging will slip down easily, expediting the sewing and roping of a bale when in the press.

The fourth part of my invention relates to the mode of elevating and holding the doors by the aid of the windlass, which is held by a ratchet, the several ropes passing from the doors to the windlass, as shown in the drawing, fully demonstrate the mode of applying; also the working the eccentric rollers door-fasteners, one being placed at each end of press, at the heel of door, worked with a lever, which is attached to the end of eccentric roller that is at the front right side of press; and so as to work both eccentrics at once, there is a reverse band attached to ends of eccentric rollers in the rear of press.

Figure 1:
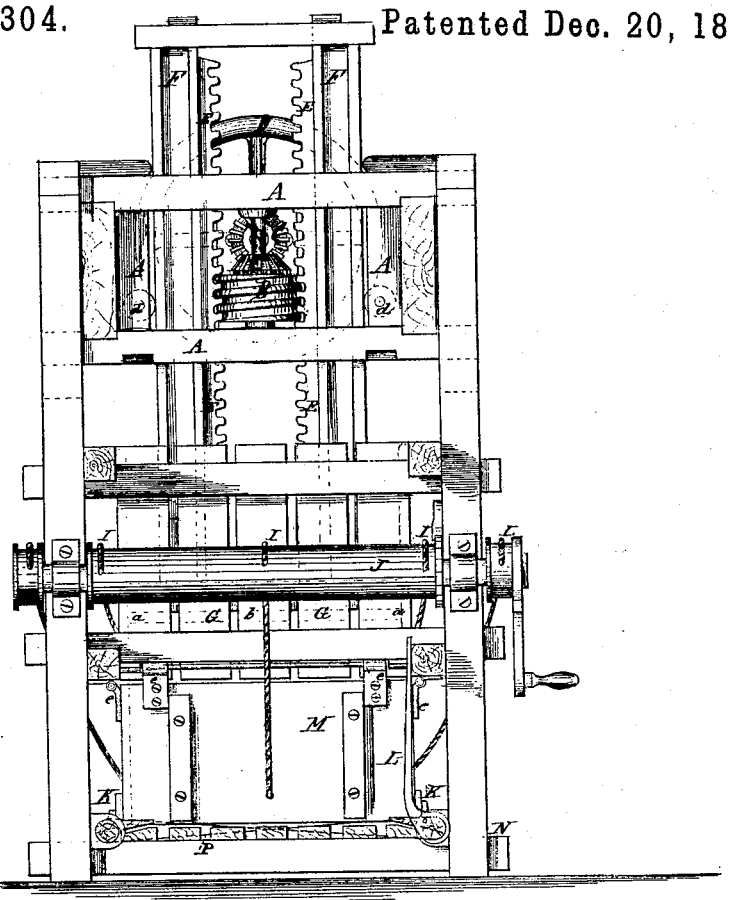
Figure 1 is a full front view of a machine embodying my invention.
Figure 2:
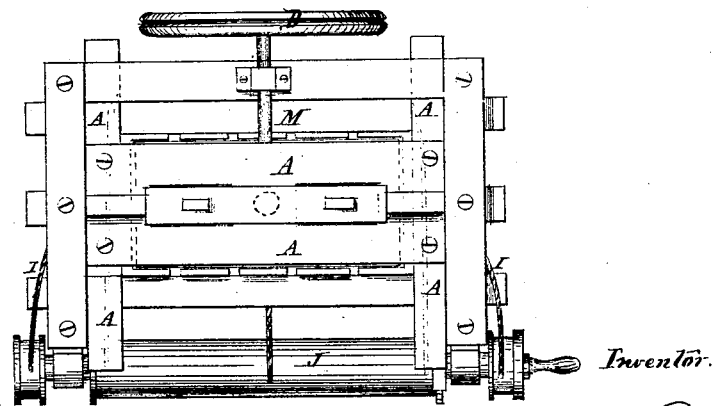
Figure 2 is a plan of the same.

A is the frame of the upper section, being the support of worm-screw, which frame should be substantially constructed to resist the vibrations of the operating parts.

B, the worm-screw, to which is attached the bevel-wheels C C, to which is attached the pulley-wheel D, from which latter motion is communicated to the operating parts.

E E, the rack, supported by heavy timbers F F, to which is attached follow-block G, showing the corners *a a a a*, guides or braces, and the space *b* and *f*, in which the surplus bagging is stowed while pressing.

A, the frame, is made not only as a bearing to the shaft M, that supports B, the worm-screw, but it also acts as a support to the rack E E and the timbers F F, so they will not give but retain a perpendicular bearing. This same frame will also act for the same purpose when the nut and ordinary screw are used.

Over the pulley-wheel D is to be passed an endless rope, or can be worked by any other convenient way.

In the frame A are friction-rollers *d*, which are placed back of timbers F F.

The doors H H H H are hung at their top with hinges *e e*, and are raised by ropes I I, which are attached to the windlass J, raising the doors out of the way while sewing and roping the bale.

The eccentric rollers K K, to hold the doors H H H H in position while the cotton or hay is being pressed, they being adjusted by the lever L, and the band N, in rear of press, being adjusted or removed by one motion.

I claim as my invention—

1. The combination of the frame A and follow-block G with the double rack E E and worm-wheel B, all constructed and arranged substantially as described, and for the purpose set forth.

2. The combination of the windlass J with eccentric rollers K K, band N, lever L, ropes I I I P, and doors M, all arranged as herein shown and described, and for the purposes set forth.

Witnesses:  NOAH W. SPEERS.
P. WICKERSHAM,
N. W. SPEERS, Jr.